Nov. 6, 1934.  D. W. VOORHEES, JR  1,979,511
TRACTOR ATTACHMENT MECHANISM
Filed Jan. 9, 1932
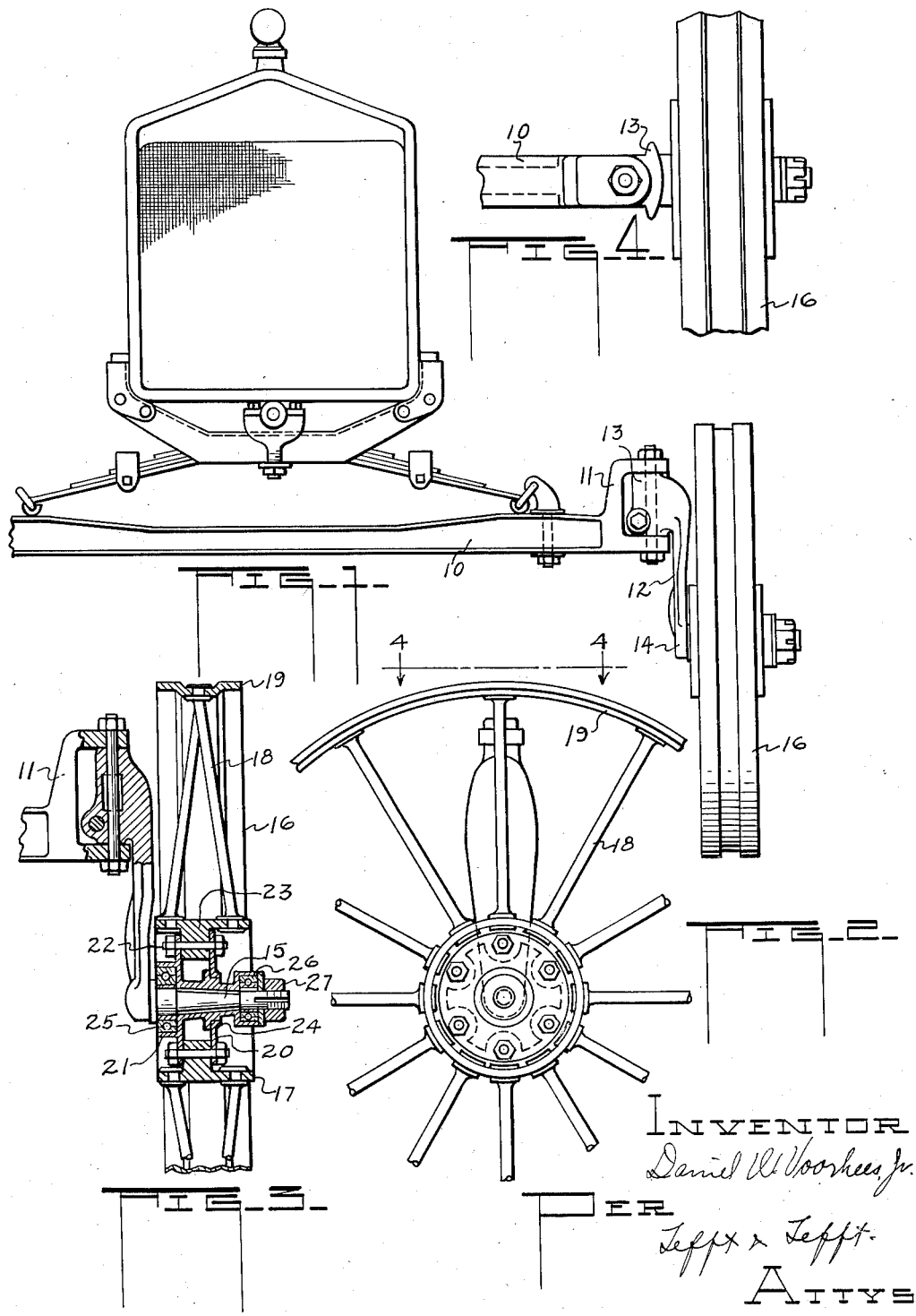

Patented Nov. 6, 1934

1,979,511

UNITED STATES PATENT OFFICE 1,979,511

TRACTOR ATTACHMENT MECHANISM

Daniel W. Voorhees, Jr., Peru, Ill.

Application January 9, 1932, Serial No. 585,688

1 Claim. (Cl. 280—96.1)

This invention relates to mechanism for attaching tractor wheels to the front axles of motor vehicles.

One of the objects of the invention lies in the provision of means for attaching steel wheels of a tractor type to the conventional front axles of motor vehicles, such mechanism operating to elevate the axle a substantial distance and therefore improve the operation of the vehicle.

Another object lies in the provision of a drop spindle attachment mechanism capable of ready attachment and detachment with the front axle of a conventional motor vehicle axle, said spindle being further arranged for operative engagement and connection with a heavy steel wheel of the tractor type.

Still another object lies in the provision of a drop spindle mechanism capable of ready attachment and connection with the front axle of a conventional motor vehicle, the spindle being capable of driving connection with a heavy steel wheel of the tractor type in such manner that the front axle of the motor vehicle will be elevated to such an extent as to permit proper operation of the vehicle over rough and uneven ground, as well as satisfactory operation when used for cultivation purposes.

Other objects will appear in the following specification, taken in connection with the annexed drawing, in which Fig. 1 is a front elevational view showing applicant's mechanism for associating tractor wheels with the front axle of a conventional motor vehicle;

Fig. 2 is a side elevational view thereof;

Fig. 3 is a front elevational view, partially in section, showing the manner of securing the tractor wheel to the front axle and the association therewith of a drop spindle member; and Fig. 4 is a plan view, looking in the direction of the arrow 4—4 of Fig. 2.

Before referring specifically to the drawing for a detailed description of applicant's tractor wheel attachment mechanism, it might be stated that the present applicant is a manufacturer of tractor attachment mechanism for motor vehicles. In other words, well known types of automobile chassis such as a Ford, Chevrolet and others, are stripped of their body and rear driving wheels in such a manner as to permit association therewith of a heavy rear tractor wheel mechanism and associated driving means for same connected with the drive shaft of the vehicle. Such tractor attachment mechanisms have been sold in large quantities to the farmer, who has thus been able to convert his old motor vehicle into a tractor satisfactory for farming use.

A disadvantage has arisen, however, in connection with such tractor attachment mechanism, such disadvantage being largely in the fact that the front axle of the conventional motor vehicle, for instance, a Ford, lies entirely too close to the ground. Obviously, the car in normal use is adapted to be operated on ordinary roads and when subjected to tractor use over uneven and rough surfaces it is quite apparent that the front axle in many instances engages the ground of such uneven surfaces in a manner to cause unsatisfactory operation of same as a tractor. Applicant has overcome such objection by novel mechanism for associating a heavy steel tractor wheel with the front axle of the conventional Ford or other motor vehicle chassis capable of use in this manner. This mechanism includes such a connection between the front axle and steel wheel as to accomplish satisfactory elevation of the axle from the ground, which will permit travel of the vehicle over uneven ground surfaces, as well as permitting the axle to pass over the crops when the tractor is used as a drawing member or power element for a cultivator.

Referring to the drawing, in Fig. 1 there is a showing of the forward portion of a well known type of car which is ordinarily used for conversion purposes into a tractor. The car shown is obviously the well known Ford, although it is apparent that applicant's mechanism might just as well be applied to other makes of car.

The front spring suspension includes the conventional front axle 10 having its ends bifurcated as at 11 to receive a spindle. It is apparent from the drawing that the conventional spindle has been removed and that applicant has attached to said spindle-receiving portion a novel spindle of what we will call a drop type. This drop spindle is referred to as 12 and comprises the axle engaging portion 13, the vertical depending drop portion 14, and the wheel engaging or hub portion 15. The conventional motor vehicle wheel has been discarded and a heavy type of steel tractor wheel 16 is secured to the drop spindle in the following manner.

A hub of considerable diameter is shown at 17, the multiple spokes 18 obviously completing the attachment between said hub and the rim 19 of the steel wheel.

Means for securing the steel wheel to the drop spindle in such manner as to permit rotation is accomplished by the dual plates 20 and 21 which are bolted in the multiple manner shown at 22 to a depending integral cast portion 23 formed on the interior of the before mentioned hub 17. These plates 20 and 21 form a part of a surrounding bearing-supporting portion 24 which is conventional in construction and is adapted to receive in the usual manner the roller bearings 25 and 26.

The final means for securing the tractor wheel to the spindle is found in the conventional threaded lug 27.

As far as the operation of applicant's tractor wheel attachment mechanism is concerned, it is thought apparent that following the removal of the ordinary spindle and motor vehicle wheel, applicant then attaches his drop spindle to the axle in exactly the same manner as the conventional spindle was attached thereto, and that he then is permitted to secure the heavy steel tractor wheel to the hub portion of the spindle, with the result that the front axle 10 is elevated a considerable degree without in any way interfering with the normal steering portions of the tractor wheels, which is, of course, accomplished by virtue of the movement of the spindle induced by the well known connecting means to the operator's steering medium.

It is believed that by virtue of applicant's novel mechanism for attaching heavy steel tractor wheels to the front axle of motor vehicles normally not used as a tractor medium, and when such mechanism is used in conjunction with the before mentioned tractor attachment mechanism for the rear of such vehicle, that said motor vehicle is then capable of use in a manner to simulate in practically every way the operation of the well known tractor. By virtue of the elevation of the front axle by such simple mechanism, without the necessity of any change in the usual parts of the front axle assembly, it is thought that the main objection to converting tractors of this type has been overcome.

What I claim is:

A tractor wheel attachment for a pleasure vehicle normally having a front axle with bifurcated spindle receiving ends, said attachment comprising an axle engaging portion adapted to be pivotally mounted about a vertical axis in the bifurcated portions of the pleasure vehicle axle, a vertical downwardly extending portion fixed to and integral with said axle engaging portion, a horizontally extending hub portion fixed to and integral with the lower end of said downwardly extending portion, and a tractor wheel pivotally mounted on said hub portion to rotate about the horizontal axis of said hub portion.

DANIEL W. VOORHEES, Jr.